(12) United States Patent
Hordos

(10) Patent No.: US 10,118,584 B2
(45) Date of Patent: Nov. 6, 2018

(54) AIRBAG INFLATOR PAD

(71) Applicant: TK Holdings Inc., Auburn Hills, MI (US)

(72) Inventor: Deborah L. Hordos, Troy, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 15/619,965

(22) Filed: Jun. 12, 2017

(65) Prior Publication Data

US 2017/0274864 A1    Sep. 28, 2017

Related U.S. Application Data

(62) Division of application No. 14/628,146, filed on Feb. 20, 2015, now Pat. No. 9,676,366.

(60) Provisional application No. 61/942,195, filed on Feb. 20, 2014.

(51) Int. Cl.
  *B60R 21/26* (2011.01)
  *B60R 21/264* (2006.01)
  *F42B 3/04* (2006.01)

(52) U.S. Cl.
  CPC ............ *B60R 21/2644* (2013.01); *F42B 3/04* (2013.01); *B60R 2021/2648* (2013.01)

(58) Field of Classification Search
  CPC ............ B01D 2279/10; B60R 21/2644; B60R 21/206; B60R 2021/2648; B60R 2021/23169; B60R 2021/2633
  USPC ............... 102/530; 280/741, 736, 730.2, 740
  See application file for complete search history.

(56) References Cited

U.S. PATENT DOCUMENTS

| | | |
|---|---|---|
| 1,331,018 A * | 2/1920 | Luthy ................ H01M 2/18 |
| | | 429/143 |
| 4,561,675 A | 12/1985 | Adams et al. |
| 4,817,828 A | 4/1989 | Goetz et al. |
| 4,907,819 A | 3/1990 | Cuevas et al. |
| 4,923,212 A | 5/1990 | Cuevas et al. |
| 5,058,921 A | 10/1991 | Cuevas et al. |
| 5,286,054 A | 2/1994 | Cuevas et al. |
| 5,368,329 A | 11/1994 | Hock et al. |
| 5,409,259 A | 4/1995 | Cunningham et al. |
| 5,531,475 A | 7/1996 | Meduvsky et al. |
| 6,032,979 A | 3/2000 | Mossi et al. |

(Continued)

OTHER PUBLICATIONS

Chinese Office Action issued in CN Application No. 201580007174.3, dated Mar. 27, 2018.

(Continued)

*Primary Examiner* — Michael D David
(74) *Attorney, Agent, or Firm* — Meunier Carlin & Curfman LLC

(57) ABSTRACT

A gas generator contains an anti-vibration, auto-igniting pad. The pad is formed from a mixture of a known auto-igniting composition mixed with an elastomeric polymer, and then cured, thereby forming a polymer—auto-igniting composition matrix. The pad is placed in thermodynamic communication with a housing on the gas generator, thereby enhancing the safety of the gas generator while yet providing a multi-functional pad. The pad is formulated to reduce vibrations when biased against an associated gas generant, while augmenting the amount of gas produced upon gas generator activation, while yet providing an auto-igniting material that is ignited during a high heat event.

20 Claims, 3 Drawing Sheets

(56) References Cited

U.S. PATENT DOCUMENTS

| | | | |
|---|---|---|---|
| 6,129,023 A | 10/2000 | Marsaud et al. | |
| 6,474,684 B1 | 11/2002 | Ludwig et al. | |
| 6,620,269 B1 | 9/2003 | Canterberry et al. | |
| 6,739,621 B2 * | 5/2004 | Parkinson | B60R 21/2644 |
| | | | 102/530 |
| 6,854,395 B2 | 2/2005 | Katsuda et al. | |
| 7,040,653 B1 | 5/2006 | Breed et al. | |
| 7,377,545 B2 | 5/2008 | Kodama et al. | |
| 7,950,693 B2 | 5/2011 | Jackson et al. | |
| 8,273,199 B1 | 9/2012 | Hordos et al. | |
| 9,073,512 B1 | 7/2015 | Mayville et al. | |
| 2003/0121578 A1 | 7/2003 | Parkinson et al. | |
| 2006/0016362 A1 | 1/2006 | Quioc et al. | |
| 2006/0202452 A1 | 9/2006 | Breed et al. | |
| 2006/0261579 A1 | 11/2006 | Breed et al. | |
| 2007/0228703 A1 | 10/2007 | Breed et al. | |
| 2008/0147278 A1 | 6/2008 | Breed et al. | |
| 2008/0243342 A1 | 10/2008 | Breed et al. | |
| 2014/0134354 A1 | 5/2014 | Mazany et al. | |
| 2015/0232057 A1 * | 8/2015 | Hordos | F42B 3/04 |
| | | | 102/530 |

OTHER PUBLICATIONS

Chinese Search Report issued in CN Application No. 201580007174.3, dated Mar. 19, 2018.

\* cited by examiner

AIRBAG INFLATOR PAD

CROSS-REFERENCE TO RELATED APPLICATIONS

The present application is a divisional of U.S. application 14/628,146, filed Feb. 20, 2015, and claims the benefit of U.S. Application Ser. No. 61/942,195 having a filing date of Feb. 20, 2014, the contents of each are hereby incorporated by reference in their entirety.

TECHNICAL FIELD

The present invention relates generally to pyrotechnic gas generators for inflatable restraint devices, and more particularly to such a gas generator having a propellant cushion for biasing a resistance against the propellant bed to prevent fracture of propellant grains and/or tablets therein. An auto-igniting anti-vibration pad may be provided at one end of an associated inflator interior, thereby dampening vibrations that may inhibit the performance of an associated gas generant. Furthermore, the auto-igniting pad is made from constituents that auto-ignite as the temperature on the exterior of the inflator increases.

BACKGROUND OF THE INVENTION

Inflatable restraint systems or "airbag" systems have become a standard feature in many new vehicles. These systems have made significant contributions to automobile safety, however, as with the addition of any standard feature, they increase the cost, manufacturing complexity and weight of most vehicles. Technological advances addressing these concerns are therefore welcomed by the industry. In particular, the gas generator or inflator used in many occupant restraint systems tends to be the heaviest, most complex component. Thus, simplifying the design and manufacturing of airbag inflators, while retaining optimal function, has long been a goal of automotive engineers.

Typical inflators are constructed having an elongate metallic body. Because many inflators utilize pyrotechnic gas generant compounds to produce inflation gas for the associated airbag, the inflator structure is necessarily robust, making such inflators correspondingly heavy. An increasingly popular and useful inflator style uses multiple, selectively activated gas generant charges. In such systems, the multiple propellant beds disposed within the inflator body may be ignited either simultaneously or serially. Certain vehicle and occupant parameters may justify firing both propellant beds in the event of a crash. Other scenarios may be best addressed by firing only one of the propellant charges, or firing the charges sequentially, with a delay between the two events. In order to avoid sympathetic ignition of one charge during firing of the other, the combustion chambers must generally be fluidly isolated. The relatively large forces on the inflator generated by the combustion of pyrotechnics therein requires the internal partitions and other structural members of the inflator that fluidly isolate the charges to be relatively sturdy, further adding to the weight of the inflator.

Various methods have been developed for constructing sturdy, internally partitioned multi-chamber inflators. One approach involves inserting a partition into the interior of the inflator, then crimping or roll-forming the inflator body to retain the partition. This approach has proven effective, however, in many circumstances a heavier-duty/thicker inflator body must be used that will withstand the crimping and/or roll forming process. Such inflator bodies can be quite heavy, and the manufacturing process is relatively complicated given processing steps necessary to secure the internal partitions.

Yet another concern is repeatability of performance of the gas generator. Propellant springs or cushions are employed to prevent fracture of the propellant thereby maintaining a relatively constant propellant surface area of combustion. Additionally, certain propellants may be hygroscopic wherein the absorption of humidity and/or water may inhibit expected burn characteristics and therefore may result in performance variability of an associated airbag cushion during a crash event. Even though useful in preventing the fracture of propellant, propellant springs or cushions add to the manufacturing complexity and cost, and to the weight of the overall inflator.

Certain gas generating compositions or auto-ignition compositions contain constituents that contain chlorine, such as potassium perchlorate or potassium chlorate. These oxidizers may liberate chlorine-containing species over extended periods of time that are typically managed by constituents contained within each composition, such as clay or calcium oxide. The concern with utilizing clay or calcium oxide is that the relative amount of solids released after inflator activation is increased as compared to compositions that do not contain metal-containing species. It would be an improvement in the art to manage chlorine-containing products residing within the inflator without the use of metal-containing species in the respective composition, thereby increasing the relative mols of gas produced per gram of gas generant while continuing to manage the chlorine-containing species to optimize the performance of the inflator.

U.S. Pat. No. 6,779,812 to Ishida et al. describes an inflator containing silicone cushioning members made from silicon rubber and silicon foam. Ishida fails to recognize the advantage of combining an auto-igniting composition with the silicone in apolymeric —auto-ignition matrix.

WO 97/29151 to Frampton describes various pharmaceutical stoppers for capping vials of pharmaceutical products. The stoppers are made of elastomeric materials containing a desiccant. Frampton does not recognize the advantage of combining an auto-igniting composition with the silicone in a polymeric —auto-ignition matrix.

SUMMARY OF THE INVENTION

It is an object of the present invention to provide a gas generator having a propellant cushion or auto-igniting pad that not only functions as a vibration dampener when biased against an associated gas generant, but that also functions as an auto-ignition device. An auto-ignition anti-vibration pad, in accordance with the present invention, autoignites at a predetermined temperature and also inhibits movement of the propellant tablets or grains by providing a bias thereagainst. The cushion is preferably formed from a polymeric matrix containing constituents that form an auto-ignition/propellant composition.

In accordance with the present invention, a suitable polymer is selected from silicone-based chains, urethanes such as polyurethane, rubbers such as ethylene propylene diene monomer (EDPM), and cellulosic derivatives. The auto-ignition propellant entrained within the polymer matrix contains at least one of the following: a fuel, an oxidizer, metal oxides, and mixtures thereof. Preferred fuels are selected from tetrazoles and salts of tetrazoles such as 5-aminotetrazole, basic salts of tetrazoles, and mixtures thereof. Preferred oxidizers are selected from alkali metal nitrate salts, alkaline earth metal nitrate salts, transition metal nitrate salts, metal and nonmetal perchlorate salts, and mixtures thereof. Catalysts selected from molybdenum salts and oxides may be provided. The auto-ignition propellant constitutes about 30-70 wt % of the total polymeric/auto-ignition propellant matrix or the auto-ignition pad/cushion. The polymer also constitutes about 30-70 wt % of the total polymeric/auto-ignition propellant matrix. The fuel(s) constitutes 20-30 wt % of the total auto-ignition composition. The oxidizer(s) constitutes about 60-70 wt % of the total auto-ignition composition. The molybdenum-containing catalyst(s) constitutes about 0-10 wt % of the total auto-ignition composition.

Other auto-igniting propellant mixtures are also suitable in the polymeric matrix. This includes mixtures containing fuels selected from carboxylic acids, reducing sugars, and mixtures thereof, and, oxidizers such as alkali metal and alkaline earth metal chlorates and perchlorates, and mixtures thereof. These fuels and oxidizers may be provided in the same weight percents as stated above. Again, the polymeric matrix is about 30-70 wt % of the total auto-ignition anti-vibration pad, and, the auto-igniting propellant is about 30-70 wt % of the total auto-ignition anti-vibration pad. In accordance with the present invention, the present auto-ignition anti-vibration pads may upon combustion form up to 50% by weight of gas, the weight percent taken with regard to the total weight of the cushion or retainer prior to combustion. Accordingly, the pad may be tailored to adjust or complement the burn rate of the main propellant.

DETAILED DESCRIPTION OF PREFERRED EMBODIMENTS

Figure 1:
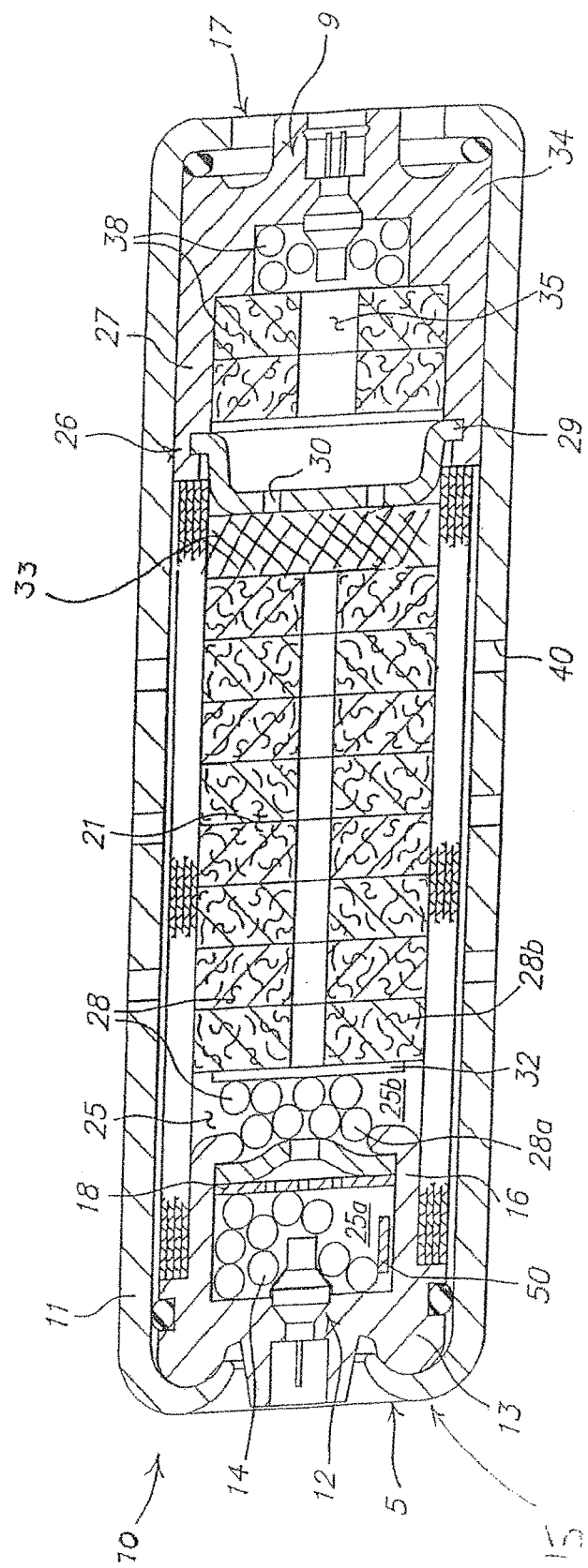
FIG. 1 is a side view of an inflator according to a first exemplary embodiment of the present invention.

Referring to FIG. 1, there is shown an exemplary gas generator or inflator 10 according to an embodiment of the present invention. Although a dual chamber inflator is described, a single or other multi-chamber inflator may also be used in accordance with the present invention. Inflator 10 is designed for use with an inflatable restraint system in an automobile, supplying inflation gas for inflation of a conventional airbag cushion, a function well known in the art. Inflator 10 may utilize two propellant charges, described herein, that are ignited in separate combustion chambers, and discharge inflation gas via a common plenum 21. Exemplary inflator 10 further provides independently operable initiators for igniting the respective propellant charges, imparting significant variation to the available operating schemes for the inflator. For instance, both sequential and serial firing of the two charges is possible, depending on the optimal deployment of the associated airbag. It is contemplated that inflator 10 will find greatest utility in passenger-side airbag systems; however, other applications are possible without departing from the scope of the present invention. All the components of the present invention are formed from known materials that are readily available commercially, and are made by known processes.

Inflator 10 includes an elongate pressure vessel or inflator body 11, preferably a hollow steel cylinder. Inflator body 11 is characterized by a first end 15 and a second end 17, and defines a plurality of inflation apertures 40 that allow fluid communication between the exterior of the inflator body and plenum 21. A first end closure 13 is positioned at first end 15 of inflator body 11, preferably creating a fluid seal therewith. A second end closure 34 is preferably positioned at second end 17, also preferably creating a fluid seal with inflator body 11. Closures 13 and 34 are preferably metallic. However, they might be made from another suitable material such as a plastic, a ceramic, or a composite material. First end 15 and second end 17 are preferably crimped inwardly to hold first and second closures 13 and 34 in place, however, some other suitable method such as welding or mating threads on inflator body 11 and the respective closures might be used. In addition, rubber O-rings may be snap-fit around closures 13 and 34, creating or enhancing seals with inflator body 11.

Inflator 10 includes a first combustion chamber 25, within which a quantity of gas generant material or first propellant charge 28 is placed. In a preferred embodiment, chamber 25 comprises a significant proportion of the interior of inflator body 11, defined in part by longitudinal walls of inflator body 11, and in part by first end closure 13. Plenum 21 is the region of inflator body 11 whereby inflation gas is passed to apertures 40. Thus, chamber 25 and plenum 21 are at least partially coextensive. Stated another way, plenum 21 may be loosely defined as the portion of chamber 25 that occupies the middle region of the interior of inflator body 11. The phrase "at least partially coextensive" should be understood to include designs wherein chamber 25 is subdivided by foils, burst shims, etc., as described herein, as well as designs wherein chamber 25 is uninterrupted by such features. First end closure 13 preferably includes a cylindrical extension 16 wherein a perforated disk 18 is positioned, separating chamber 25 into two sub-chambers 25a and 25b. An initiator assembly 12, preferably including a conventional igniter or squib, is positioned at first end 15, and preferably mounted in first end closure 13 such that it can ignite compositions in chamber 25. A second initiator assembly 9, also preferably including a conventional igniter or squib, is positioned at second end 17.

Propellant charge 28 may be any suitable gas generant composition known in the art, preferably a non-azide composition containing phase stabilized ammonium nitrate. Other gas generating compositions or auto-ignition compositions contained within the gas generator may contain perchlorate and chlorate containing oxidizers as known in the art. Exemplary, but not limiting formulations are described in U.S. Pat. Nos. 5,872,329, 5,756,929, and 5,386,775, and are herein incorporated by reference. In a preferred embodiment, propellant charge 28 is provided in both tablet 28a and wafer 28b forms, both of which are illustrated in FIG. 1. The tablets 28a and wafers 28b may be different compositions, but are preferably the same material in different, commercially available forms. In a preferred embodiment, a retainer disk 32 separates tablets 28a from wafers 28b. Disk 32 may be made from a relatively porous material such that a flame front or heat from ignition of tablets 28a can ignite wafers 28b, or it may be made from a known material that allows ignition of wafers 28b by heat convection from the burning of tablets 28a. A quantity of booster propellant 14 is preferably placed in sub-chamber 25a, and is ignitable via initiator 12 in a conventional manner to ignite and enhance the burn characteristics of the first propellant charge 28a and 28b.

In accordance with the present invention, it may be desirable to eliminate the use of a booster composition 14 or 38, and instead insert an anti-vibration pad 33*a* or cushion in its place. Accordingly, the embodiment of FIG. 1 may be modified to contain a cushion 33*a* in lieu of booster compound or composition 38 adjacent closure 34. It will be appreciated that the auto-ignition pad 33*a* in lieu of composition 38 provides a booster composition and yet also function as an auto-ignition composition. Notably end closure 34 thermodynamically communicates with pad 33.

In further accordance with the present invention, an auto-ignition and anti-vibration pad or cushion 33 is preferably positioned between propellant tablets 28*b* and a cap 29 (or the base), thereby inhibiting fracture of the tablets 28*b* and maintaining contact with a large surface area of the cap 29 that also thermodynamically communicates with housing 11 and end closure 34. It will be appreciated that cushion 33 may also be positioned anywhere within the inflator 10, and may provide a resilient support wherever required therein. Accordingly, the shape of the cushion 33 is not limited to the exemplary structure shown.

The cushion 33 may be formed by mixing a desired amount of the auto-ignition constituents in a desired uncured polymer such as silicone. The polymer or silicone may then be finally mixed to a substantially homogeneous mixture, and cured according to manufacturer instructions. Silicone is readily available and may for example be provided by companies such as Shin-Etsu of Japan.

Further, in an alternative method of forming the pad 33, the auto-ignition constituents as described below, may first be homogeneously mixed in a known manner, and then sprinkled into an uncured elastomer such as silicone. The elastomer is then cured in accordance with manufacturer's instructions.

A partitioning assembly 26 is positioned proximate second end 17, and preferably comprises a substantially cylindrical base member 27 and a cap 29. Base member 27 and cap 29 define a second combustion chamber 35 that at least partially encases a second quantity of propellant 38, preferably in both tablet and wafer form. Base member 27 and second end closure 34 may be the same piece, as in one preferred embodiment, or a plurality of separate, attached pieces might be used. In a preferred embodiment, partitioning assembly 26 is formed structurally independent from inflator body 11. Partitioning assembly 26 is an independent piece having no physical attachment with the longitudinal sidewall of inflator body 11. During assembly of inflator 10, partitioning assembly 26 is slid into position in inflator body 11, and second end 17 may be crimped inwardly or otherwise formed about partitioning assembly 26 to secure assembly 26 therein. In the same way, first end 15 may also be crimped inwardly or otherwise formed about end closure 13, thereby closing the first end 15 in a similar manner. Thus, other than securing second end closure 34, no modifications are made to inflator body 11 to accommodate or otherwise secure the components defining second combustion chamber 35.

Cap 29 preferably includes a plurality of apertures 30 that can connect second chamber 35 with plenum 21 (as well as first chamber 25, since plenum 21 and chamber 25 are fluidly connected and partially coextensive). In a preferred embodiment, a foil or burst shim (not shown) is placed across apertures 30 to block fluid communications between the two chambers. It should be appreciated, however, that the foil or burst shim is positioned and/or manufactured such that it will not burst inwardly, i.e. in the direction of second end 17 during combustion of propellant in chamber 25.

Combustion of propellant in second chamber 35, on the other hand, is capable of bursting the foil or shim outwardly, allowing the combustion products in chamber 35 to escape to plenum 21/first chamber 25, and thereby discharge from inflator body 11. The preferred foils and shims, and the described methods of mounting them are all known in the art. By fluidly isolating first and second chambers 25 and 35, sympathetic ignition of the propellant in chamber 35 during combustion of the propellant in chamber 25 can be avoided, as described herein. The outer diameter of base member 27 is preferably substantially equal to the inner diameter of inflator body 11, such that base member 27 is nested therein, i.e. fits relatively snugly. Because both second end closure 34 and inflator body 11 are preferably substantially cylindrical, the two components are preferably axially aligned. One or more autoignition tablets 50 may be placed in inflator 10, allowing ignition of the gas generant materials upon external heating in a manner well known in the art.

In one embodiment, wafers 28*b* are positioned in a stack in plenum 21. Again, the cushion 33, is positioned adjacent the stack 28*b*, and biases the entire stack 28*b* toward first end 15. Wafers 28*b*, in turn, preferably bias disk 32 against tablets 28*a*, thereby preventing tablets 28*a* and/or wafers 28*b* from being jostled while the inflator is idle for long periods, and thus mitigating potential mechanical degradation of tablets 28*a* and/or wafers 28*b*.

The inflator 10 described herein may be altered in design depending on application requirements. Nevertheless, the cushion or propellant restraint 33, in accordance with the present invention is provided in any inflator design, and biased against at least one propellant thereby providing a cushioning effect as formally realized by metallic cushions for example.

In a typical inflatable restraint system design, inflator 10 is connected to an electrical activation system that includes a crash sensor, of which there are many well-known suitable types. In addition, various sensing systems may be incorporated into the vehicle electronics, including seat weight sensors, occupant detection systems, etc. During a typical deployment scenario, an impact or a sudden vehicle deceleration, an activation signal is sent from an onboard vehicle computer to inflator 10. The signal may be sent to either or both of the initiator assemblies housed with inflator 10. Because chamber 25 preferably contains the larger, main charge, the activation signal is typically directed initially to the initiator assembly operably associated with first chamber 25. In certain scenarios, for example with larger occupants, or where occupants are out of a normal seated position in the vehicle, it may be desirable to activate both propellant charges simultaneously. Other scenarios may call for different activation schemes. For instance, certain conditions may make it desirable to fire only the first propellant charge, or sequentially fire both charges, with varying time delays between the two events. Once an electrical activation signal is sent to the initiator associated with first chamber 25, combustion of booster propellant 14, or alternatively combustion of an auto-ignition anti-vibration pad 33 in subchamber 25*a* is initiated. The flame front and/or hot combustion gases from booster 14 or auto-ignition anti-vibration pad 33 subsequently traverse disk 18, initiating combustion of propellant tablets 28*a* in chamber 25*b*. The burning of tablets 28*a* produces inflation gas that flows rapidly out inflation apertures 40, initiating filling of an associated airbag. A cylindrical, metallic mesh filter 23 is preferably positioned in inflator body 11, and filters slag produced by the combustion of the compounds therein, also serving as a heat sink to reduce the temperature of the inflation gas.

Combustion of tablets 28a initiates combustion of wafers 28b, preferably made from the same or similar material as tablets 28a, providing a sustained burn that delivers a relatively constant supply of gas to the associated airbag via plenum 21 and apertures 40. When desired, an electrical activation signal is sent to the initiator operably associated with second chamber 35, containing a gas generant composition 38 that is preferably similar to the composition in chamber 25, or, in lieu of or in conjunction with gas generant 38, containing a pad 33 constructed or formed as described herein. Rapid creation of gas in chamber 35 causes a rapid rise in the gas pressure therein, outwardly bursting the foil or shim (not shown) that covers apertures 30, in cap 29. The gas is subsequently discharged from inflator 10 via plenum 21 and apertures 40. Activation of the gas generant in chamber 35 can take place before, during, or after an activation signal is sent to initiator assembly 12, operably associated with chamber 25.

Because both chambers 25 and 35 discharge inflation gas through plenum 21, the present invention provides different operating advantages over many earlier designs wherein separate plenums are used for each combustion chamber. By discharging inflation gases from both combustion chambers 25 and 35 through plenum 21, the inflation profile characteristics across the length and width of an associated airbag can be improved as compared to earlier multi-chamber designs wherein the combustion chambers discharge via separate plenums. In addition, the use of a partitioning assembly structurally independent from the inflator body sidewalls allows the inflator to be constructed without crimping or otherwise modifying the inflator body itself. Moreover, because inflator 10 utilizes a plenum that is coextensive with a first of the combustion chambers, inflator 10 has a simpler design than multi-chamber inflators utilizing combustion chambers that are both partitioned from a common plenum. Inflator body 11 utilizes no attached internal partitions, and can therefore be manufactured without the need for strengthening to compensate for weakening caused by partition attachment. These and other advantages reduce the cost, manufacturing complexity, size and weight of the inflator.

Figure 2:
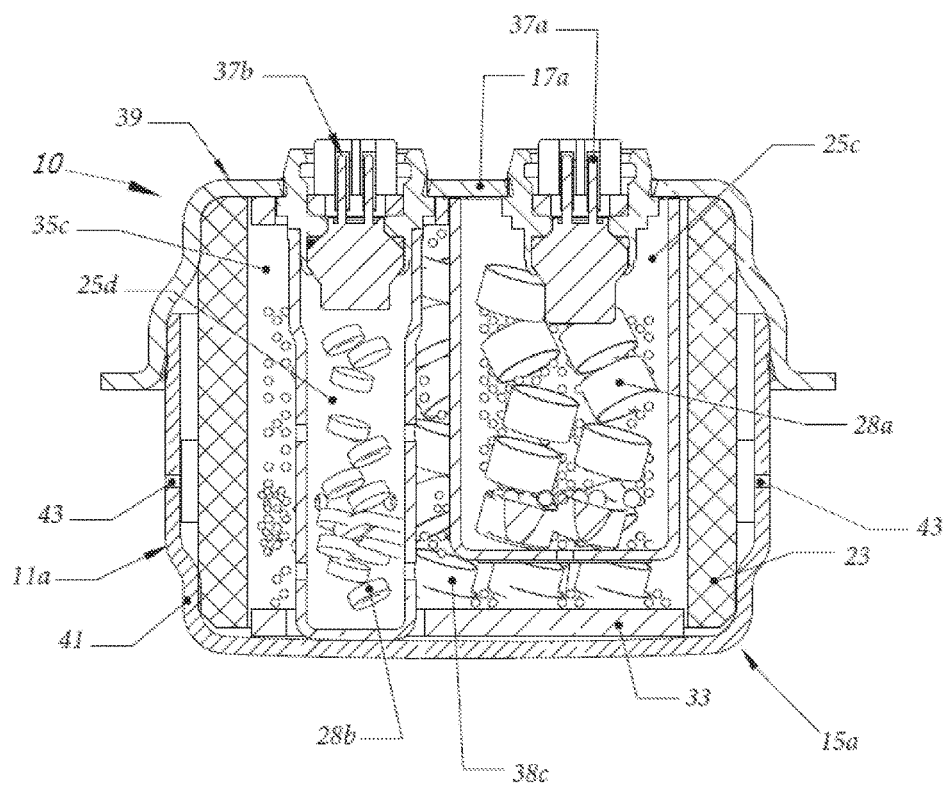
FIG. 2 is a side view of an inflator according to a second exemplary embodiment of the present invention.

Referring now to FIG. 2, a second exemplary embodiment of an inflator of the present invention is shown. As seen in FIG. 2, the pad 33 may rest against the base 39 or cap 41, thereby maximizing the surface area of the pad or elastomeric retainer 33 that is in contact with the inflator housing 11a. It will be appreciated that the various constituents in FIG. 2 are similar to those in FIG. 1, even though the housing 11 a and the various chambers are formed as a driver-side inflator (FIG. 2) rather than a passenger-side inflator (FIG. 1). Referring again to FIG. 2, a housing 11a contains a first end 15a and a second end 17a. In this embodiment, a first igniter or squib 37a is fixed within second end 17a, in ignitable communication with a first combustion chamber 25c. A first gas generating composition or propellant 28a is stored within the first chamber 25c, for generating gases upon ignition and combustion thereof. In the same way, a second igniter or squib 37b is fixed within second end 17a, in ignitable communication with a second combustion or booster chamber 25d. A second composition such as a booster composition 28b is stored within the second combustion or booster chamber 25d, for generating combustion products upon combustion and ignition thereof. A third combustion chamber 35c is defined by the interior of the housing 11a, and fluidly communicates with chamber 25d, and chamber 25c if selectively operated in a known manner. A third composition such as a gas generating composition 38c may be the same or different as propellant 28a, and is ignited upon actuation of the inflator 10, and more specifically, by actuation of chambers 25c and/or 25d in a known manner.

The inflator of FIG. 2 operates substantially similar to the inflator exemplified in FIG. 1. To exemplify operation of a gas generator 11 or 11a in accordance with the present invention, and with reference to FIG. 2 and FIG. 3, a predetermined signal may be received by the crash event sensor 210, thereby actuating igniter 37b by and through an algorithm contained within a control unit in a known manner. Booster (or other) composition 28b is thereby ignited to combust and produce combustion products and heightened pressure. Composition 38c is then ignited and combusted by the resultant combustion heat, pressure, flame, gas, and more generally, the combustion products, that are transferred from chamber(s) 25c and/or 25d to chamber 35c. As gas generant 38c combusts, the resultant gases migrate through filter 23 and out gas generant orifices 43 located in cup 41 of housing 11a.

Figure 3:
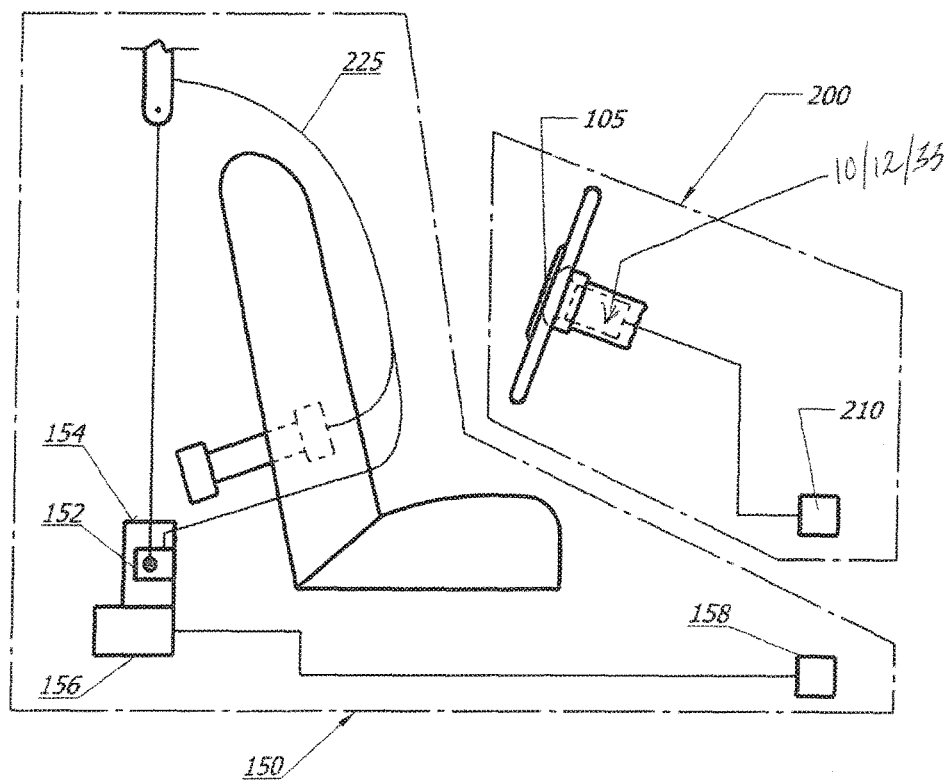
FIG. 3 is a schematic view of an exemplary gas generating system, a vehicle occupant protection system, in accordance with the present invention.

Referring now to FIG. 3, the exemplary inflator 10 described above may also be incorporated into an airbag system 200. A schematically represented airbag system 200 includes at least one airbag (not shown) and an inflator 10 containing a pad 33, for cushioning a gas generant composition 12, in accordance with the present invention. The inflator 10 is coupled to the airbag (not shown) in the steering wheel so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 10 in the event of a collision.

It should be appreciated that airbag system 200, and more broadly, vehicle occupant protection system 180 exemplifies but does not limit gas generating systems contemplated in accordance with the present invention. The present description is for illustrative purposes only, and other embodiments may also be formed in accordance with the present invention. Thus, those skilled in the art will appreciate that various modifications could be made to the presently disclosed embodiments without departing from the intended scope of the present invention.

What is claimed is:

1. A gas generator comprising:
    a gas generating composition; and
    an auto-igniting pad comprising:
        a fuel;
        an oxidizer; and
        an elastomeric polymer in an amount from about 30-70 weight percent relative to the total weight of the auto-igniting pad.

2. The gas generator of claim 1 wherein the auto-igniting pad comprises a fuel comprising a tetrazole, a triazole, a carboxylic acid, a sugar, or a mixture thereof.

3. The gas generator of claim 1 wherein said oxidizer comprises an alkali metal nitrate, an alkaline earth metal nitrate, a transition metal nitrate, a metal perchlorate, a non-metal perchlorate, or a mixture thereof.

4. The gas generator of claim 1, wherein the auto-igniting pad further comprises a molybdenum salt or a molybdenum oxide.

5. The gas generator of claim 1 wherein the auto-igniting pad, upon combustion, produces up to 50 percent by weight of gas relative to the total weight of the pad prior to combustion.

6. The gas generator of claim 1, wherein the auto-igniting pad is auto-ignitable at a temperature from 150°-210° C.

7. The gas generator of claim 1, wherein the auto-igniting pad has an auto-ignition temperature lower than the auto-ignition temperature of the gas generating composition.

8. The gas generator of claim 1, comprising a first combustion chamber, said gas generating composition contained within said first combustion chamber.

9. The gas generator of claim 8, wherein said auto-igniting pad is contained within said first combustion chamber.

10. The gas generator of claim 5, wherein the auto-igniting pad is biased against the gas generating composition.

11. A vehicle occupant protection system comprising the gas generator of claim 1.

12. The gas generator of claim 8, further comprising a second combustion chamber comprising a propellant composition, said second chamber in ignitable communication with said first chamber.

13. The gas generator of claim 12, wherein said second combustion chamber comprises a second auto-igniting pad comprising:
a fuel;
an oxidizer; and
an elastomeric polymer in an amount from about 30-70 weight percent relative to the total weight of the said second auto-igniting pad.

14. The gas generator of claim 13 wherein the second auto-igniting pad comprises a fuel comprising a tetrazole, a triazole, a carboxylic acid, a sugar, or a mixture thereof.

15. The gas generator of claim 13 wherein wherein said oxidizer comprises an alkali metal nitrate, an alkaline earth metal nitrate, a transition metal nitrate, a metal perchlorate, a non-metal perchlorate, or a mixture thereof.

16. The gas generator of claim 13, wherein said second auto-igniting pad comprises a urethane, a silicone, a rubber, a cellulosic derivative, a ethylene propylene diene polymer, or a mixture thereof.

17. The gas generator of claim 13, wherein said second auto-igniting pad polymer comprises silicone.

18. The gas generator of claim 13, wherein the said second auto-igniting pad is auto-ignitable at a temperature from 150°-210° C.

19. The gas generator of claim 13, wherein the auto-igniting pad has an auto-ignition temperature lower than the auto-ignition temperature of the propellant composition.

20. A vehicle occupant protection system comprising the gas generator of claim 13.

* * * * *